United States Patent
Yang et al.

(10) Patent No.: US 10,186,754 B2
(45) Date of Patent: *Jan. 22, 2019

(54) ANTENNA INTEGRATED INTO A TOUCH SENSOR OF A TOUCHSCREEN DISPLAY

(71) Applicant: Intel Corporation, Santa Clara, CA (US)

(72) Inventors: Songnan Yang, San Jose, CA (US); Xintian E Lin, Palo Alto, CA (US); Quanjie Forest Zhuang, Shanghai (CN); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/877,231

(22) Filed: Oct. 7, 2015

(65) Prior Publication Data
US 2016/0093943 A1 Mar. 31, 2016

Related U.S. Application Data

(63) Continuation of application No. 12/975,952, filed on Dec. 22, 2010, now Pat. No. 9,184,502.

(51) Int. Cl.
| | | |
|---|---|---|
| *H01Q 1/24* | (2006.01) | |
| *H01Q 1/38* | (2006.01) | |
| *G06F 3/041* | (2006.01) | |
| *H01Q 1/22* | (2006.01) | |
| *H01Q 7/00* | (2006.01) | |

(52) U.S. Cl.
CPC ............ *H01Q 1/243* (2013.01); *G06F 3/041* (2013.01); *H01Q 1/2266* (2013.01); *H01Q 1/38* (2013.01); *H01Q 7/00* (2013.01); *G06F 2203/04103* (2013.01); *Y10T 29/49016* (2015.01)

(58) Field of Classification Search
CPC ........ H01Q 1/243; H01Q 1/2266; H01Q 1/38; H01Q 7/00; G06F 3/041; G06F 2203/04103; Y10T 29/49016
See application file for complete search history.

(56) References Cited

U.S. PATENT DOCUMENTS

| | | | |
|---|---|---|---|
| 6,661,408 B2 | 12/2003 | Chen | |
| 2004/0183788 A1* | 9/2004 | Kurashima | ......... G06F 3/03547 345/173 |

(Continued)

FOREIGN PATENT DOCUMENTS

| | | |
|---|---|---|
| KR | 20080090152 A | 10/2008 |
| KR | 20080090152 A | 10/2008 |

(Continued)

OTHER PUBLICATIONS

"U.S. Appl. No. 12/975,952, Advisory Action dated May 19, 2015", 3 pgs.

(Continued)

*Primary Examiner* — Jessica Han
*Assistant Examiner* — Michael Bouizza
(74) *Attorney, Agent, or Firm* — Eschweiler & Potashnik, LLC

(57) ABSTRACT

A touch sensor with a transparent conductive layer and a metalized border area at least partially bordering the transparent conductive layer and forming a far-field antenna.

19 Claims, 12 Drawing Sheets

(56) References Cited

U.S. PATENT DOCUMENTS

| | | |
|---|---|---|
| 2005/0062725 A1 | 3/2005 | Shih |
| 2008/0165158 A1 | 7/2008 | Hotelling et al. |
| 2010/0219513 A1 | 9/2010 | Zhang et al. |
| 2010/0321325 A1 | 12/2010 | Springer et al. |
| 2012/0162032 A1 | 6/2012 | Yang et al. |

FOREIGN PATENT DOCUMENTS

| | | | | |
|---|---|---|---|---|
| KR | 20080113506 A | | 12/2008 | |
| KR | 20080113506 A | | 12/2008 | |
| KR | 20110133371 A | * | 12/2011 | ............. H01Q 1/243 |
| WO | 2010021357 A1 | | 2/2010 | |
| WO | WO-2010021357 A1 | | 2/2010 | |
| WO | 20100126756 A2 | | 11/2010 | |
| WO | WO-2010126756 A2 | | 11/2010 | |
| WO | 2012088111 A2 | | 6/2012 | |
| WO | 2012088111 A3 | | 6/2012 | |
| WO | WO-2012088111 A2 | | 6/2012 | |
| WO | WO-2012088111 A3 | | 6/2012 | |

OTHER PUBLICATIONS

"U.S. Appl. No. 12/975,952, Final Office Action dated Mar. 3, 2015", 14 pgs.

"U.S. Appl. No. 12/975,952, Non Final Office Action dated Jun. 6, 2014", 14 pgs.

"U.S. Appl. No. 12/975,952, Notice of Allowance dated Jul. 7, 2015", 8 pgs.

"U.S. Appl. No. 12/975,952, Response filed May 8, 2015 to Final Office Action dated Mar. 3, 2015", 12 pgs.

"U.S. Appl. No. 12/975,952, Response filed Oct. 31, 2014 to Non Final Office Action dated Jun. 6, 2014", 10 pgs.

"International Application Serial No. PCT/US2011/066157, International Preliminary Report on Patentability dated Jul. 4, 2013", 7 pgs.

"International Application Serial No. PCT/US2011/066157, International Search Report dated Aug. 17, 2012", 5 pgs.

"International Application Serial No. PCT/US2011/066157, Written Opinion dated Aug. 17, 2012", 5 pgs.

International Preliminary Report on Patentability for International Application No. PCT/US2011/066157 dated Jul. 4, 2013.

International Search Report for International Application No. PCT/US2011/066157 dated Aug. 17, 2012.

Written Opinion for International Application No. PCT/US2011/066157 dated Aug. 17, 2012.

Non-Final Office Action dated Jun. 6, 2014 in connection with U.S. Appl. No. 12/975,952.

Final Office Action dated Mar. 3, 2015 in connection with U.S. Appl. No. 12/975,952.

Notice of Allowance dated Oct. 7, 2015 in connection with U.S. Appl. No. 12/975,952.

* cited by examiner

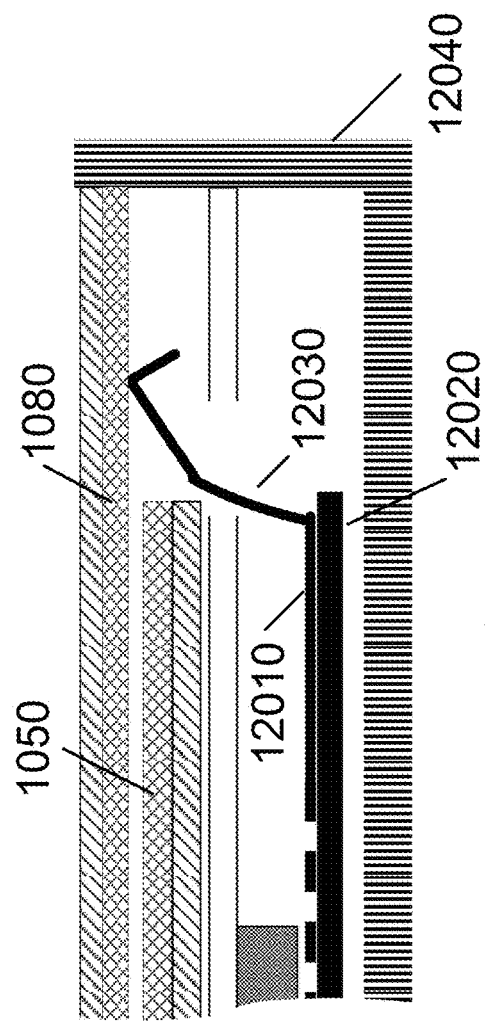
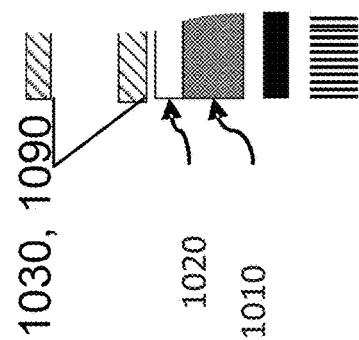
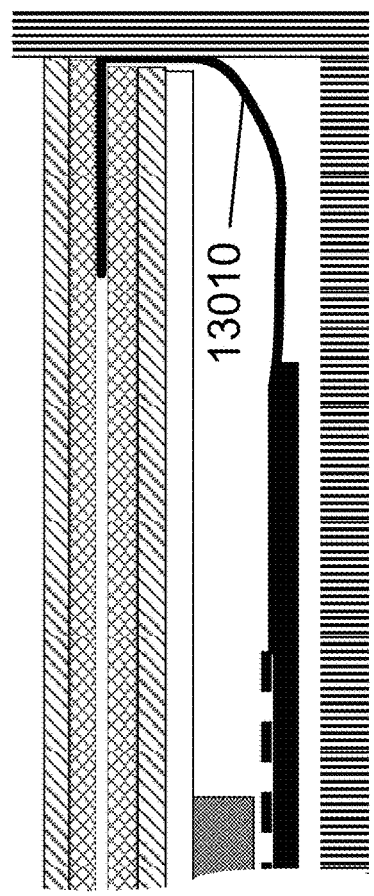
Fig. 12
Fig. 13

US 10,186,754 B2

ANTENNA INTEGRATED INTO A TOUCH SENSOR OF A TOUCHSCREEN DISPLAY

PRIORITY APPLICATION

This application is a continuation of U.S. application Ser. No. 12/975,952, filed Dec. 22, 2010, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Corp. All Rights Reserved.

BACKGROUND

Touch screen devices have become increasingly popular as an input device for many reasons. Some reasons include an improved and more natural user experience, and the ability to eliminate external input devices thereby freeing up more room for a larger display.

Typical touch screen displays employ a touch sensor composed of multiple layers of conductive transparent material placed in front of a display device. Typically the conductive transparent layers of the touch sensor have metalized border areas that are used to make various electrical connections. These metalized border areas are often made from printed silver ink.

Manufacturers of devices employing touch screen technology often desire a large screen and a sleek cosmetic exterior. To accomplish this, they often employ touch screens that are as large, or nearly as large as the casing of the devices. Sometimes manufacturers even employ metal casings.

These metal layers in the touch sensors, along with any metal in the chassis poses a problem for many mobile device manufacturers. These mobile device manufacturers typically include a radio frequency (RF) transmitter and receiver which utilize an antenna to transmit and receive data and voice communications. In order to ensure clear transmission and reception from all sides of the device, manufacturers often cut-out a portion of the metalized borders, or metal chassis to allow for the RF antenna to radiate and prevent interference to its radiation performance from the metallic pieces.

SUMMARY

Disclosed in one example is a mobile computing device with a casing; a radio frequency transmitter disposed inside the casing; a radio frequency receiver disposed inside the casing; and a touch-screen display disposed inside the casing with a display screen and a touch sensor comprising a transparent conductive layer disposed on top of the display screen and a metalized border area at least partially bordering the transparent conductive layer and forming a far-field antenna which is operatively coupled with the radio frequency transmitter and the radio frequency receiver.

In another example, disclosed is a method of sending a radio wave by generating a radio frequency signal using a radio frequency transmitter; routing the radio frequency signal to a far-field antenna formed from a metalized border region of a transparent conductive layer of a touch sensor; and transmitting the radio frequency signal with the antenna.

In another example, disclosed is a method of creating an RF far-field antenna by forming a gap in a portion of a metalized border region of a transparent conductive layer of a touch sensor, the gap leaving a shape of a far-field antenna.

In yet another example, disclosed is a touch sensor with a transparent conductive layer and a metalized border area at least partially bordering the transparent conductive layer and forming a far-field antenna.

These examples can be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 12 shows one example mechanism to connect the RF source to the integrated antenna.

FIG. 13 shows one example mechanism to connect the RF source to the integrated antenna.

Figure 1:
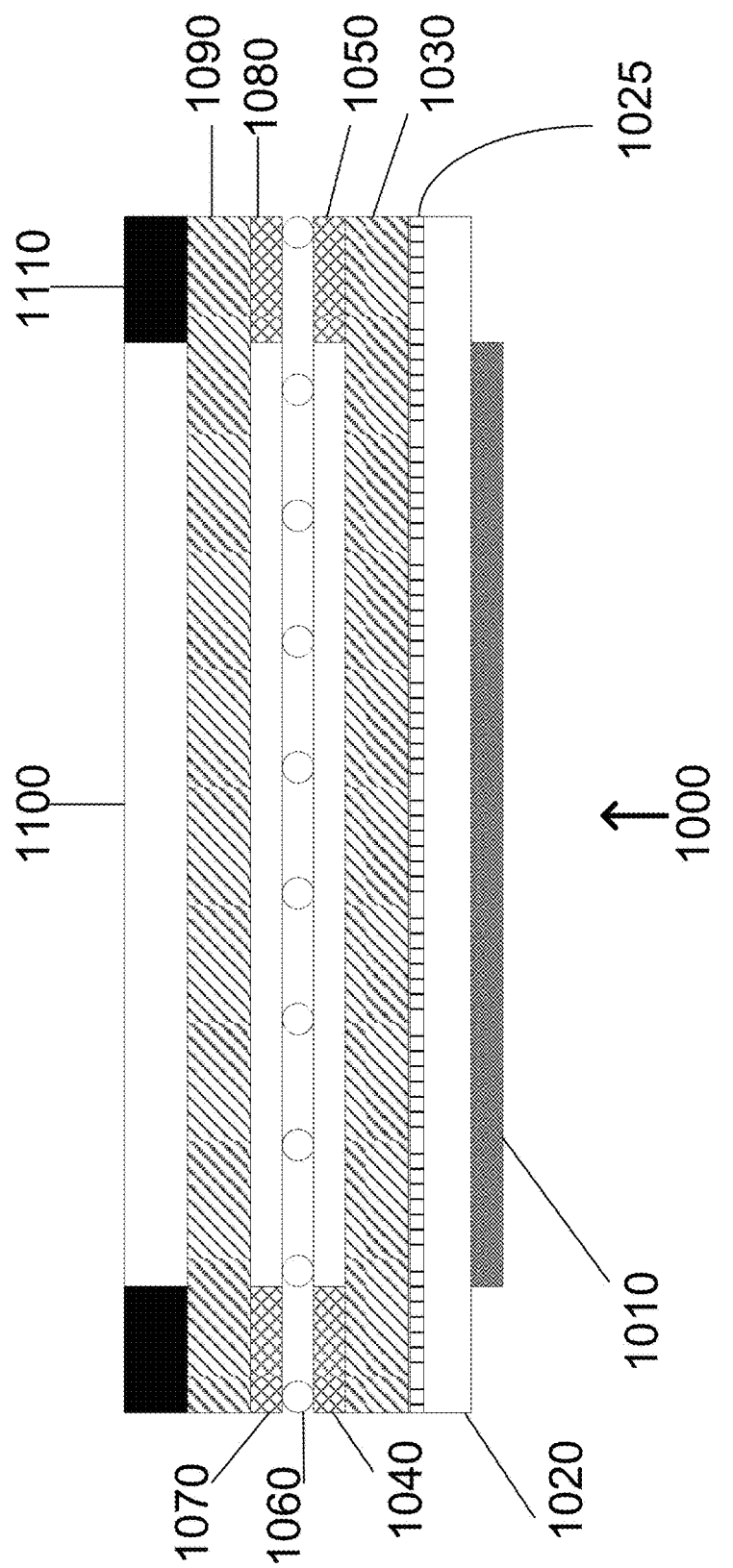
FIG. 1 shows a perspective view of an example resistive touch screen display.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In order to reduce interference to the embedded antenna's performance from the metal in the touch screen display and/or the metal chassis of mobile devices, manufacturers often cut-out a portion of the metalized borders in the touch screen display or metal chassis to allow the RF signal to radiate and to prevent interference from the metallic pieces. These solutions still suffer from unsatisfactory signal loss as invariably, even with a cutout, the metal components inside the device still detune the antenna and shield the RF signal to some degree. Additionally, from a cosmetic standpoint, cutouts in the chassis often are unsightly. Therefore, what is needed in the art is a better way to enable an RF signal to be transmitted from or received by devices with touchscreen displays.

Touch sensors used in touch screen displays operate under a number of principles. These technologies typically include resistive, surface capacitive, projective capacitive (including mutual and self capacitance), infra-red, acoustical wave, or acoustical pulse. Among these technologies, the most common are resistive, surface capacitive, and projected capacitive.

Figure 2:
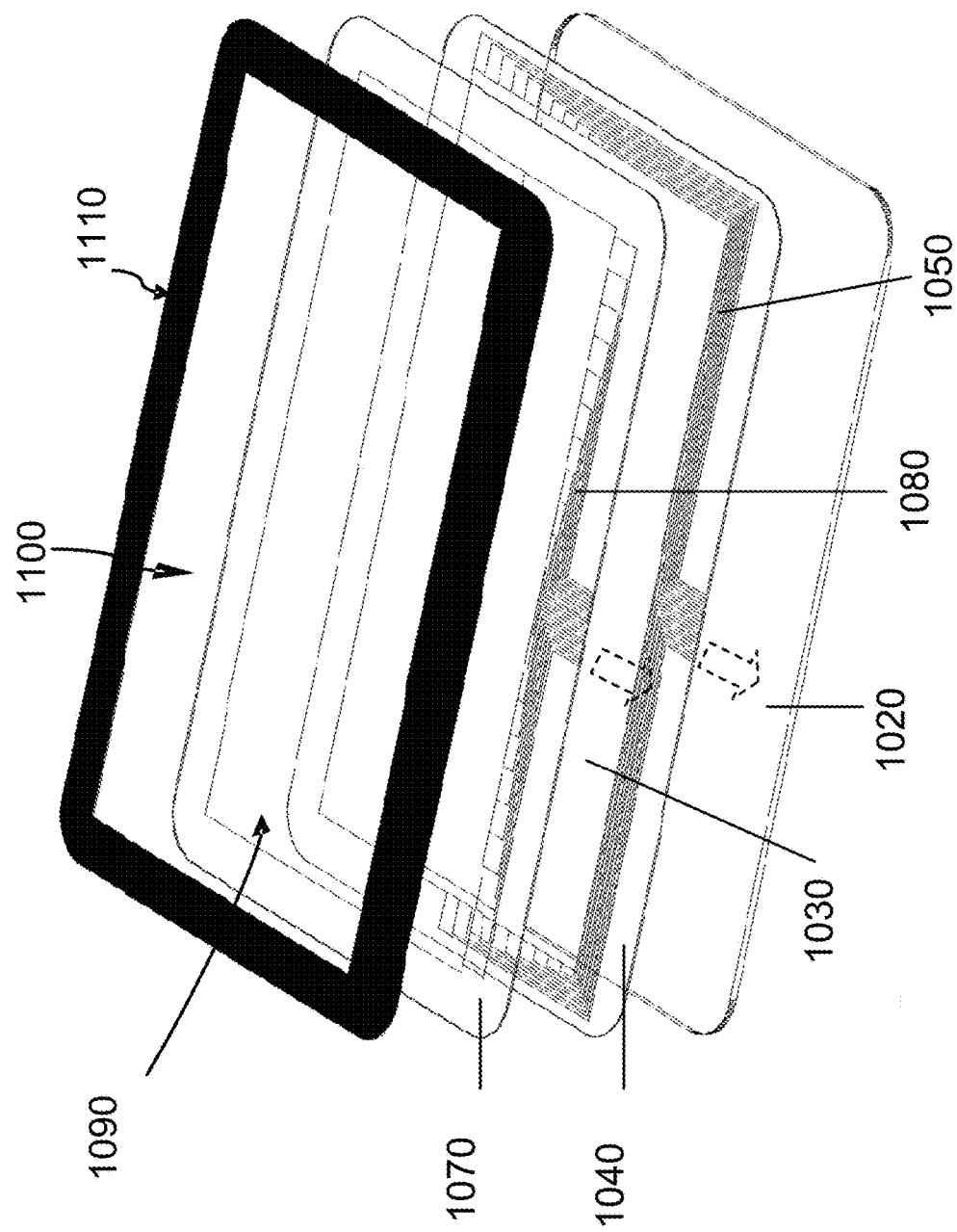
FIG. 2 shows a different perspective view of an example resistive touch screen sensor.

A touchscreen display consists of a touch sensor mounted to a display. FIG. 1 shows a cross section of a typical resistive touch sensor mounted to a display screen forming a touchscreen display 1000. The display screen 1010, in this example, an LCD screen, is shown located underneath a polycarbonate layer 1020. Above polycarbonate layer 1020, an optical glue tape 1025 bonds a first layer of a transparent conductive material 1030. In many cases, this layer is made from an indium tin oxide ("ITO") coated onto a clear plastic. Printed on the ITO film 1030, around the edges of ITO film layer 1030, and as visible in FIG. 2, is a metalized border region 1040. Often this metalized border region 1040 is made by printing or sputtering silver ink on the ITO film layer 1030. Metalized border region 1040 contains electrodes 1050, which are formed by creating channels in the silver ink 1040. In some examples, metalized border region 1040 is adjacent to, but not on top of transparent conductive material 1030. On top of metalized border region 1040 are insulating dots, or spacers 1060. These spacers 1060 separate the metalized border region 1040 with electrodes 1050 from another metalized border region 1070 with associated electrodes 1080 adhered to a second layer of transparent conductive material 1090. A final, transparent protective layer 1100 is then added on top with an opaque rim 1110 to hide the metallic border sections and associated wiring. FIG. 2 shows a perspective view of the various components of FIG. 1.

In a resistive touch sensor, in one example, a drive voltage is applied to electrodes 1050 which produces a voltage gradient across the transparent conductive layer 1030. The voltage linearly changes from the minimum drive voltage at one end to the maximum drive voltage at the other end of the transparent conductive layer 1030. When a resistive touch sensor is pressed, the spacers 1060 are compressed in the area of the touch allowing the transparent conductive film layers 1030 and 1090 to touch. Once the transparent conductive layers 1030 and 1090 are touching as the result of the pressing of the sensor, a circuit is completed and a current or potential flows through transparent conductive layer 1090 to electrodes 1080. The voltage at the point of contact is measured and used to determine one coordinate of the particular touch. The process is then repeated, but this time applying current to the electrodes 1080 and measuring the voltage or potential at electrodes 1050.

In surface capacitive touch sensors, an insulator is coated on one side with a transparent conductive layer such as ITO. A small voltage is applied to the ITO, usually through electrodes created in a metalized border region. This voltage creates a uniform electrostatic field. When a finger presses the uncoated side of the insulator, a capacitor is formed. A position of the touch can be determined by measuring the capacitance of all four corners of the transparent conductive layer.

In projected capacitance touch sensors (which include mutual and self capacitance displays) one or more layers of a transparent conductive material such as ITO are spatially separated and terminate with electrodes printed on the metalized border areas of the one or more layers. The transparent conductive material on one layer is usually arranged as columns, and the other layer is usually arranged in rows, although other patterns are possible.

In self capacitance touch sensors which utilize projected capacitance, to determine the coordinate position, the capacitive load of a finger is measured on each row and each column, where the columns and rows operate independent of each other. Thus the touch sensor would know that, for example, the second column and the third row were pressed. Multiple touches are problematic with surface capacitance touch sensors. For example, if column 0 and row 2 was pressed at the same time as column 3 and row 1, this would generate 4 possible coordinate points, as the controller would see that rows 1 and 2 were pressed and columns 0 and 3 were pressed, but have no way of knowing which of the four possible points corresponding to those two columns and those two rows was pressed.

Mutual capacitance projected capacitance touch sensors solve this problem. Similar to the other types previously mentioned, this type of touch sensor features at least two layers of a transparent conductive material such as ITO spatially separated and terminated with electrodes printed on the border areas of the one or more layers. The ITO on one layer is usually arranged as columns, and the other layer is usually arranged in rows, although other patterns are possible.

The controller applies a drive voltage to a single row and then scans every column (or vice versa), measuring the mutual capacitive value at that row/column intersection. The process is then repeated constantly. This results in discrete (X, Y) points for each touch, even with multiple touches. As a result, the mutual capacitance touch sensors are able to determine multiple touches accurately.

Despite the differing technologies, one common element of all these types of touch sensors is one or more transparent, conductive layers with a metalized border region in which electrodes are formed. Typically the metalized border area is formed by coating the borders of the conductive ITO layers with a silver ink that is then notched to create electrodes. The silver ink consequently borders the entire transparent conductive layer, even areas where no electrodes are etched.

The various conductive elements of a touch sensor, such as the metalized border areas of the transparent conductive layers, block and inhibit RF signals from antennas behind, or near the electrodes and conductive layers. Given the large touch screen displays currently being used by mobile and other device manufacturers, this presents a large hurdle to overcome in terms of RF reception and transmission. Additionally, sometimes manufacturers also utilize metal chassis to offer a sleeker look, further blocking RF transmission and reception.

In order to allow RF into and out of the device, device manufacturers employ holes cut in the silver ink layer, and/or case, and place the antenna behind that cutout. In the example of a hole cut in the case, the manufacturer usually covers the hole with a plastic or other non-conductive material, leaving an unsightly material transition area. In this scenario, the hole cut in the case can have other disadvantages as well. Depending on the size of the device and the position of the cut-out, users who hold the device a certain way may block RF transmission and reception. It is very difficult for device manufacturers to design a hole-cut out that minimizes the potential for a user blocking the RF transmission and reception given the variety of usage patterns employed by users and the often small footprint of these devices. Additionally, many conductive materials are still in close proximity to the RF antenna reducing performance. Increased manufacturing costs are also a problem with cutting a hole in the metalized border area as the touch sensor manufacturer and the device manufacturer have to coordinate to align the hole and the antenna perfectly, or near perfectly.

In one example, the present disclosure relates to improved radiating structures created from the touch sensor itself. In some examples, the metalized border areas along the edges of the inner layers of a touch sensor are used to form radiating structures. In some examples, this radiating structure is an antenna created by etching, or otherwise removing, a portion of an unused section of the metalized border area of one or more of the layers of the touch sensor. In some examples, the antenna can be used to radiate and receive far field radiation.

Figure 3:
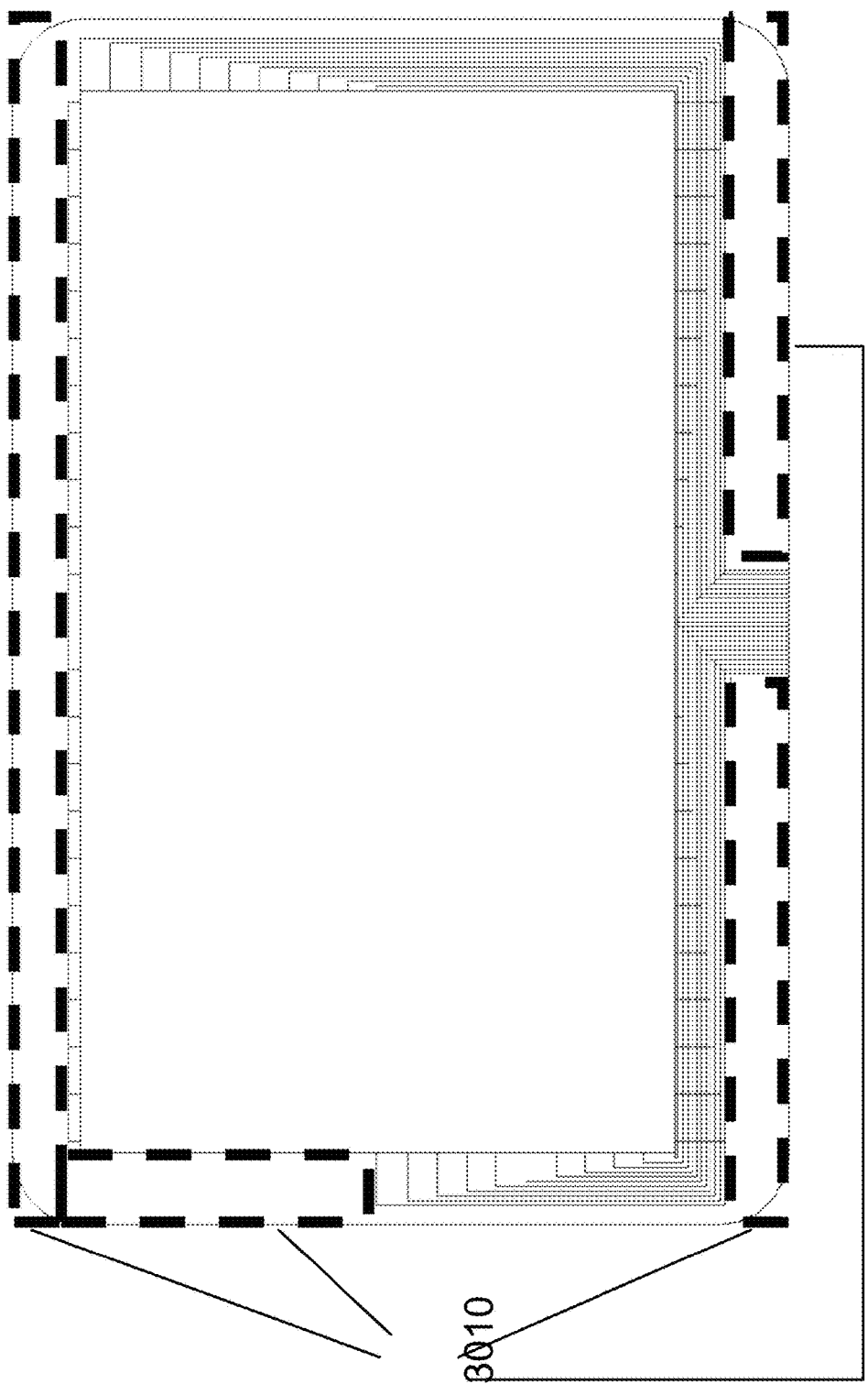
FIG. 3 shows a perspective view of an example layer of a resistive touch screen sensor with associated unused metalized border area.

As already noted, the various transparent conductive layers with the associated metalized border areas with electrodes typically contain unused metalized areas. The metalized border region can be made of any conductive material that is used to form electrodes to apply a current across the transparent conductive layer. In some examples, the metalized border area consists of silver ink printed or sputtered onto, or next to, the transparent conductive layers. FIG. 3 illustrates these areas 3010 with boxed rectangles indicating unused space of the metalized border in one of the conductive transparent layers of an example resistive touch sensor. The areas not taken up by the electrodes are unused and conductive, and thereby block RF signals.

Figure 4:
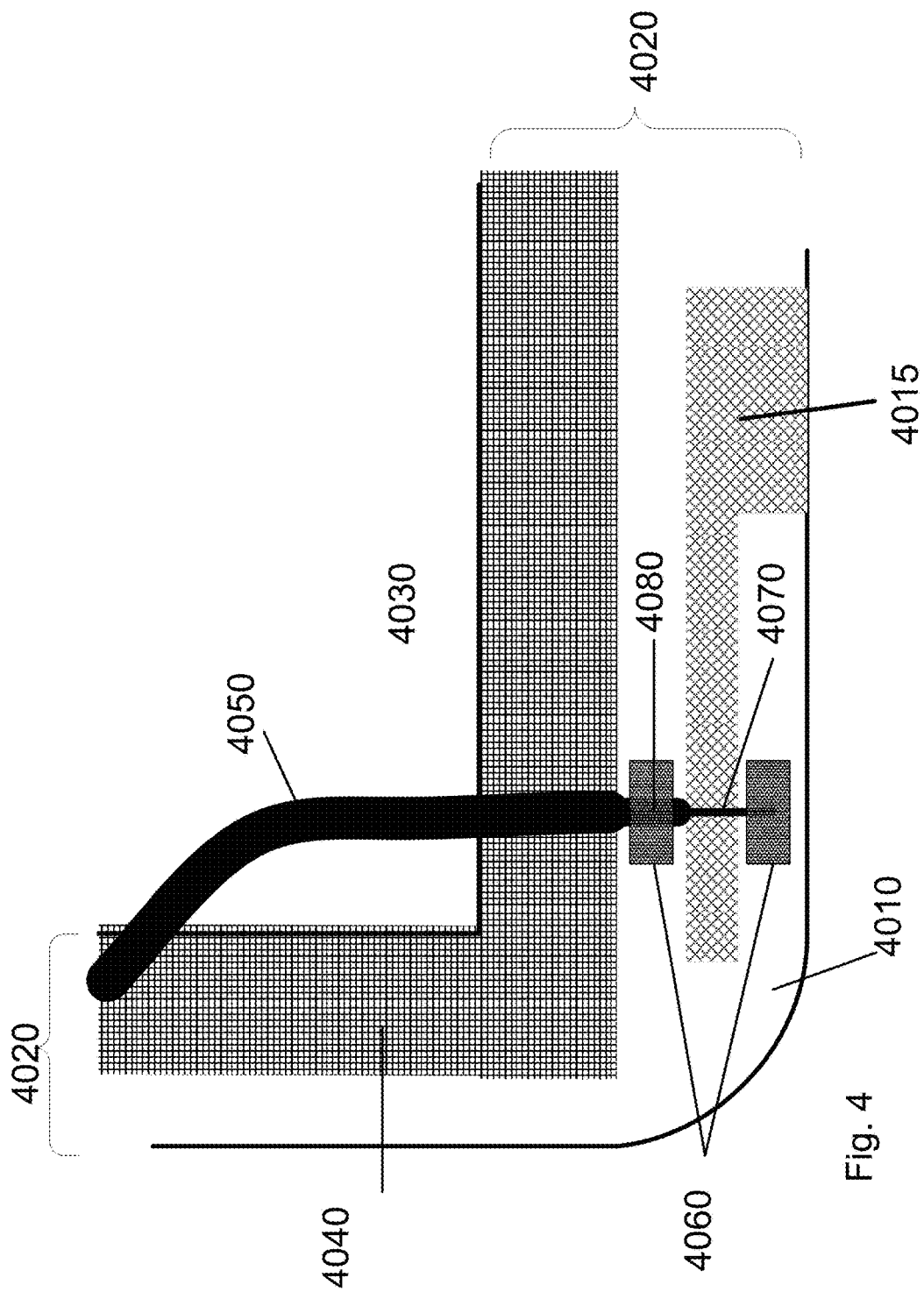
FIG. 4 shows an example antenna integrated with the metalized border of a touch sensor.

FIG. 4 shows one example of the present disclosure. In FIG. 4, an inverted "F" style antenna 4010 for WWAN and WLAN services is shown fabricated from the metalized border area 4020 on one of the inner conductive transparent layers 4030 by removing a section 4015 of the silver ink forming the metalized border that is unused by electrodes 4040. As can be seen in FIG. 4, the antenna shape 4010 is formed from the metalized border region that is left over after removing part of the metalized border. In some examples, the metalized border can be a silver ink.

The RF antenna can be created in the metalized border region in a variety of ways. For example, the antenna can be created by adding the antenna structure into the mask used to define the patterns of the silver ink region prior to the silver ink being printed or otherwise deposited, or after the conductive transparent layer with metalized border has been manufactured by removing a portion of the metalized border region by scraping, etching, or any other removal process. In other examples, a portion of the metalized border region is prevented from adhering to the underlying layers during the touch sensor manufacturing process in order to form the antenna. In one example, the cutout 4010 may be masked to prevent adhesion of the silver ink to the layers below.

Figure 5:
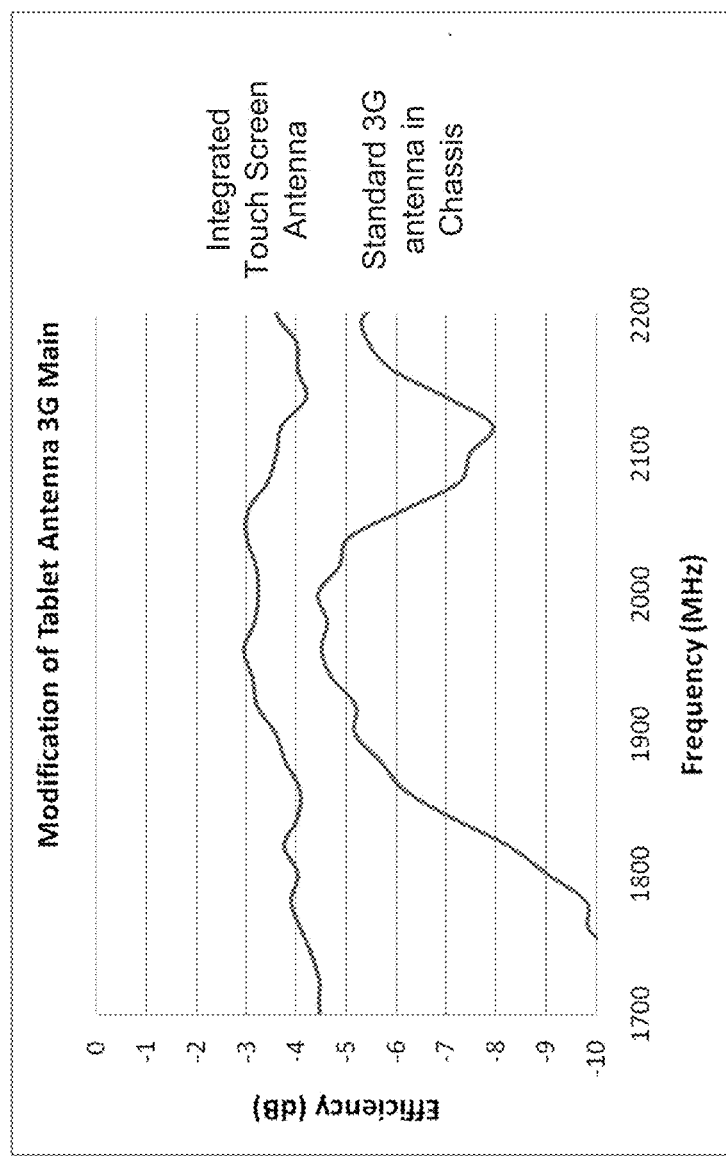
FIG. 5 shows the efficiency of an example antenna integrated with the metalized border of a touch screen display.

Because the very structures that were blocking the RF signal before are now used to radiate the signal, antenna reception and radiation is improved. FIG. 5 shows a comparison of antenna efficiency of the current 3G antenna in a chassis covered by a touch screen display with cutouts for antennas vs. the 3G antenna integrated within the touch sensor of the touchscreen display. The top line is the efficiency of the 3G antenna integrated with the touchscreen display, and the bottom antenna is the current 3G antenna. As can be appreciated, this antenna structure is more efficient across the spectrum as a 1-6 +dB improvement is measured across the 3G high bands.

Figure 6:
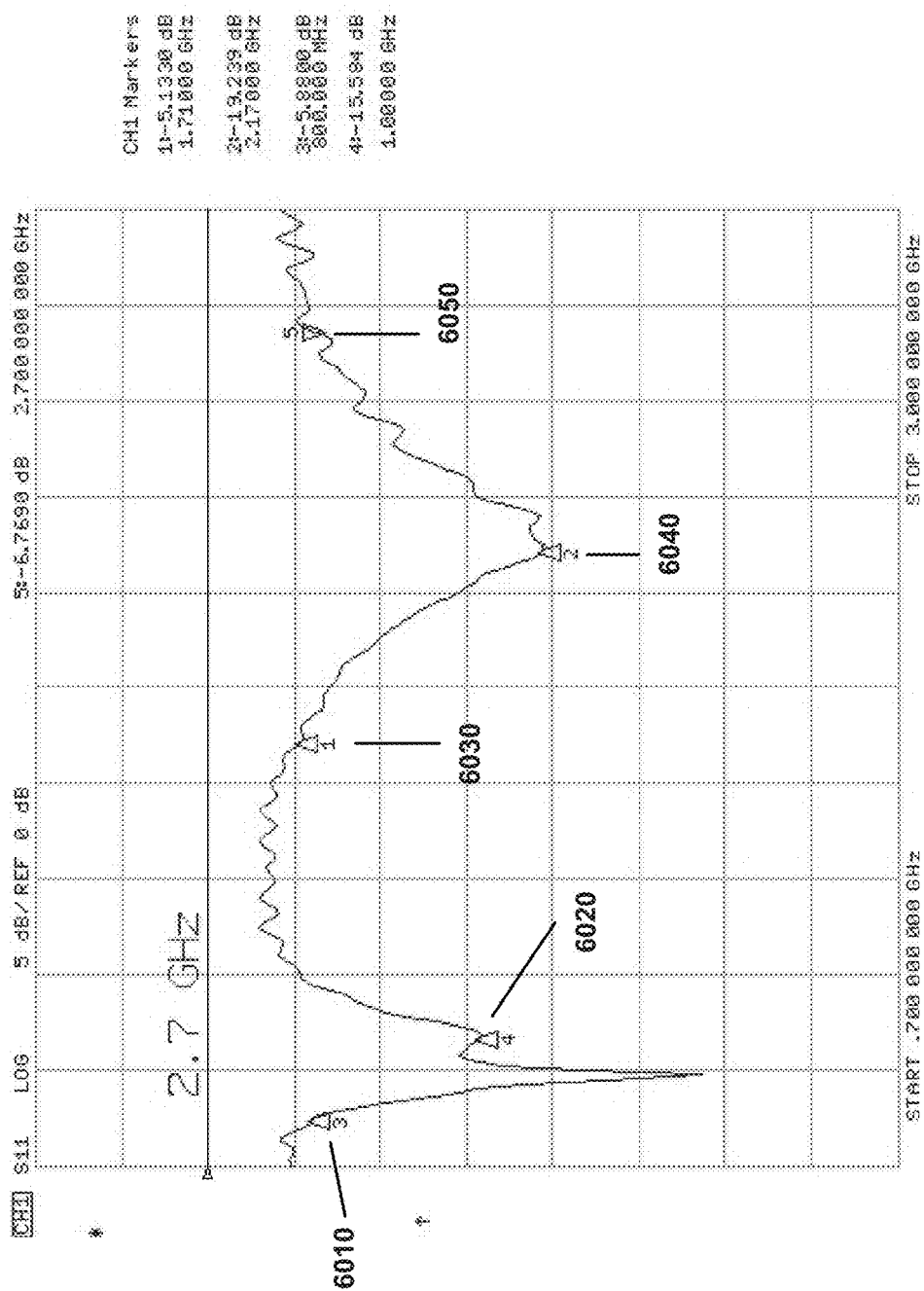
FIG. 6 shows the return loss performance of an example antenna integrated with the metalized border of a touch screen display.

The measured return loss of one example of an antenna integrated into a touch sensor of a touchscreen display is shown in FIG. 6. Return loss is the difference, in dB, between forward and reflected power measured at any given point in an RF system. The y-axis of the graph indicates the measured return loss and the X-axis is frequency. The graph then describes the measured return loss for a particular frequency. At 6010, which is 800 MHz, and corresponds to a point beyond the lower end GSM 850 bands, the measured return loss is −5.88 dB. At 6020, which is 1 GHz, and corresponds to a point beyond the higher end GSM 900 bands, the measured return loss is −15.584 dB. At 6030, the frequency is 1.71 GHz which corresponds to the start of the DCS spectrum, the measured return loss is −5.1330 dB. At 6040 the frequency is 2.17 GHz and the measured return loss is −19.239 dB. 2.17 GHz corresponds to the end of the WCDMA Band 1. Finally, at 6040, at a frequency of 2.7 GHz, the end of the 2.5 GHz WiMAX band, the return loss is −6.7690 dB. As can be appreciated, the antenna is capable of supporting all cellular frequency bands including GSM 850, 900, DCS, PCS, and UMTS bands, and 2.4 GHz ISM band as well as 2.3 and 2.5 GHz WiMAX band with good return loss performances.

Figure 7:
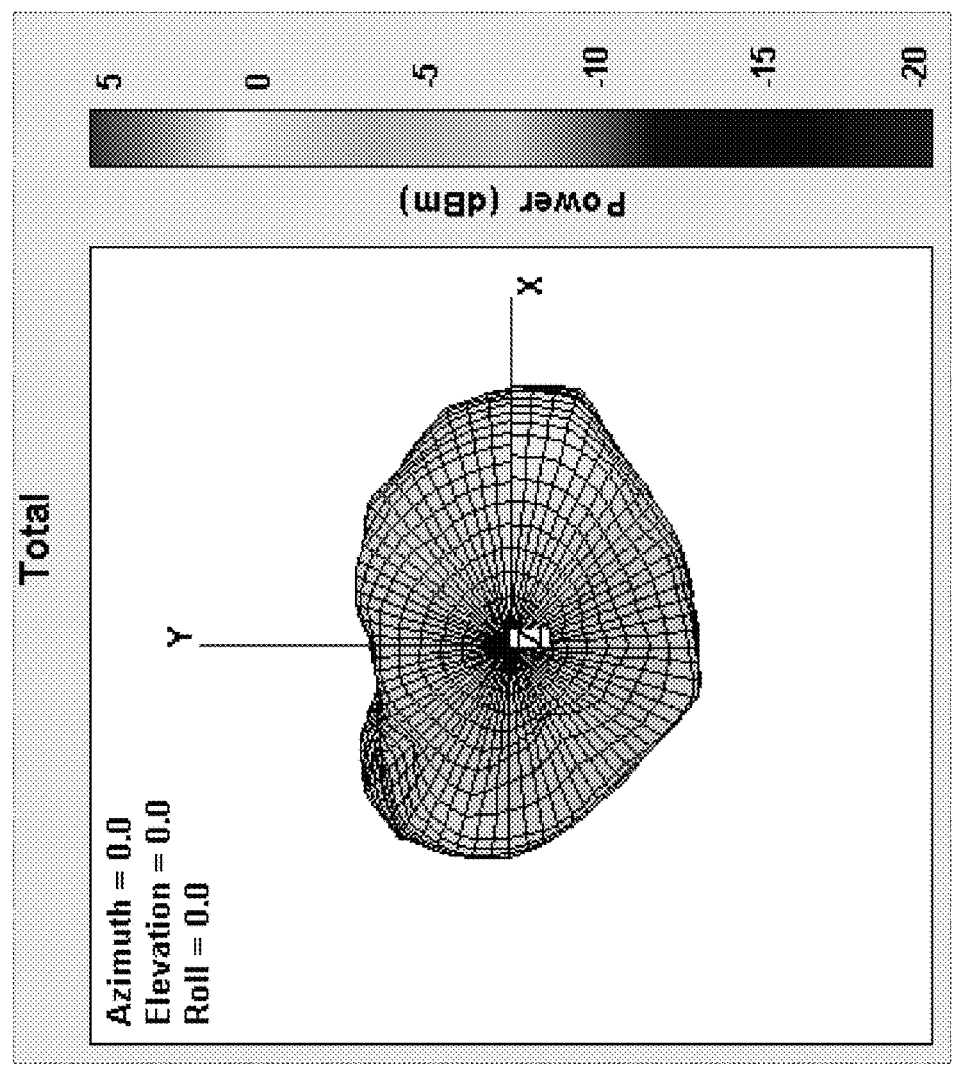
FIG. 7 shows the radiation pattern of an example antenna integrated with the metalized border of a touch screen display.

FIG. 7 shows the radiation pattern of one example implementation of antennas integrated into a touch sensor of a touchscreen display, which shows good omni-directional radiation. This is particularly desirable for WWAN and WLAN applications. The device length is the Y axis, the device width is the X axis, and the device depth is the Z axis.

Figure 9:
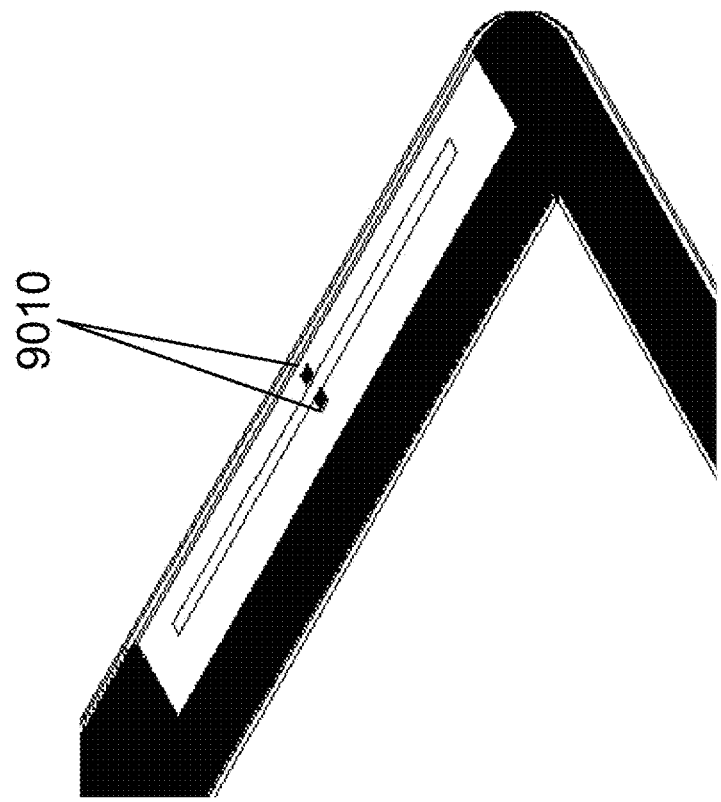
FIG. 9 shows another example antenna integrated with the metalized border of a touch sensor.
Figure 8:
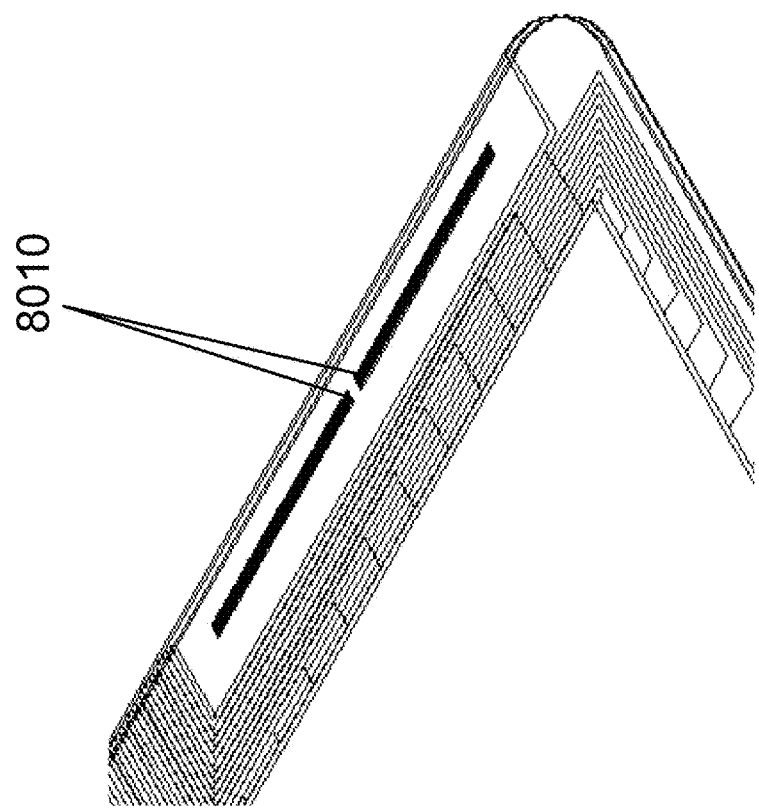
FIG. 8 shows another example antenna integrated with the metalized border of a touch sensor.
Figure 11:
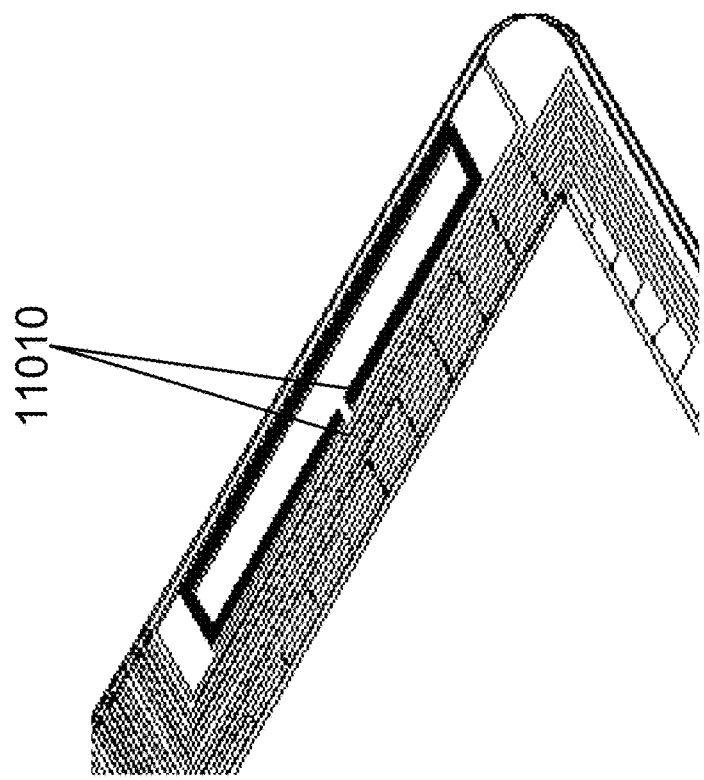
FIG. 11 shows another example antenna integrated with the metalized border of a touch sensor.
Figure 10:
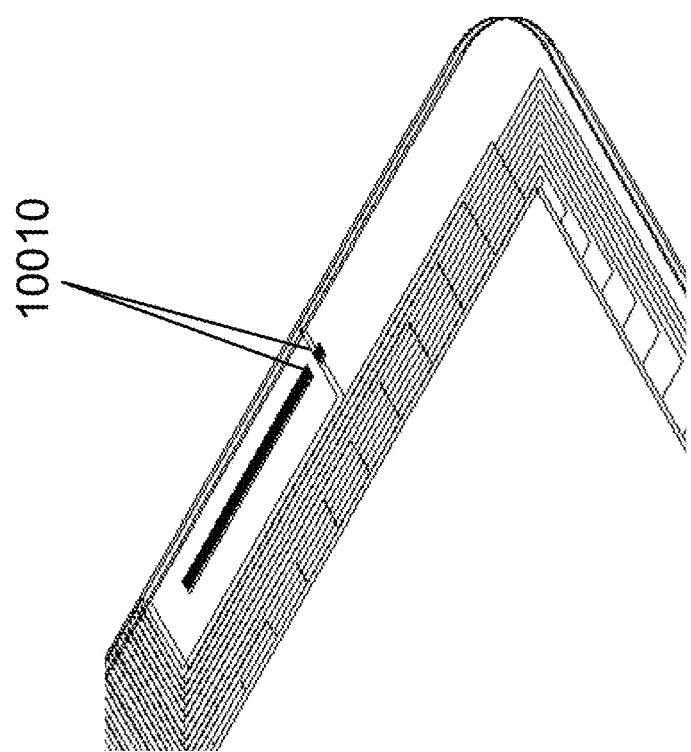
FIG. 10 shows another example antenna integrated with the metalized border of a touch sensor.

While FIG. 4 shows an inverted F-type antenna, other antenna shapes and types are possible. These include, but are not limited to, dipole (FIG. 8), slot (FIG. 9), monopole (FIG. 10), loop (FIG. 11), patch, and PIFA (planar inverted F). Any antenna shape that can be etched or fabricated from one or more layers of the metalized border can be created. These antennas can be used to receive and transmit wireless signals such as AMPS, GSM, GPRS, EDGE, UMTS, WIMAX, Wi-Fi, Flash-OFDM, UMTS-TDD, EV-DO, HSPA, RTT, LTE, BLUETOOTH™, WIBREE™, ZIGBEE™, Wireless USB, Digital TV, and any other wireless RF signal that can be transmitted or received by an antenna. These signals can be of any frequency band including, but not limited to, microwave frequencies (0.3-300 GHz).

In each of FIGS. 8-11, reference numerals 8010, 9010, 10010, and 11010 indicate typical RF feeding locations. The feed location determines the resonance frequency and impedance of the antenna, so moderate tuning can be achieved by slightly offsetting the feeding and grounding locations of the antenna. In this respect, the antennas are tunable. All that needs to be done is to adjust, slightly, the feeding and grounding locations.

In some examples, only one layer of conductive transparent layer with metalized border region can be used to form the antenna, with the metalized border regions of another layer cutout to allow omni-directional radiation. In other examples, multiple metalized layers can have the same pattern or can be connected locally to form one radiating structure. In some other examples, one metalized border region is the primary radiating structure and others can be secondary radiating structures.

Additionally, while the lower left quadrant of the inner metalized layers was utilized for the antenna of FIG. 4, as FIG. 3 shows, other unused areas can be utilized. While FIG. 3 shows areas that can be used in one example touch sensor implementation, other touch sensors may have different usable areas. Any area of the metalized border that may fit an antenna can be used.

In FIG. 4 a direct cable connection is shown where an RF cable 4050 feeds the antenna and is connected using copper tape 4060 to provide conductive contact between the inner 4070 and outer 4080 conductor of the coaxial cable and the modified silver ink layer. Other feeding topologies can also be used. FIG. 12 shows in one example, RF fed directly by RF traces 12010 on the mother board 12020 through metal spring connectors 12030 to the antenna. The mobile device's chassis is shown as 12040. Also shown are display screen 1010, polycarbonate layer 1020, transparent conductive layers 1030 and 1090 and metalized border areas 1050 and 1080. The RF could also be fed from the mother board to the antenna using a flexible printed circuit or FPC. FIG. 13 shows one example where a FPC 13010 feeds the integrated antenna between two metalized border areas. The FPC can be connected to the mother board via. transmission line structures on the FPC or an extra coaxial cable.

Figure 14:
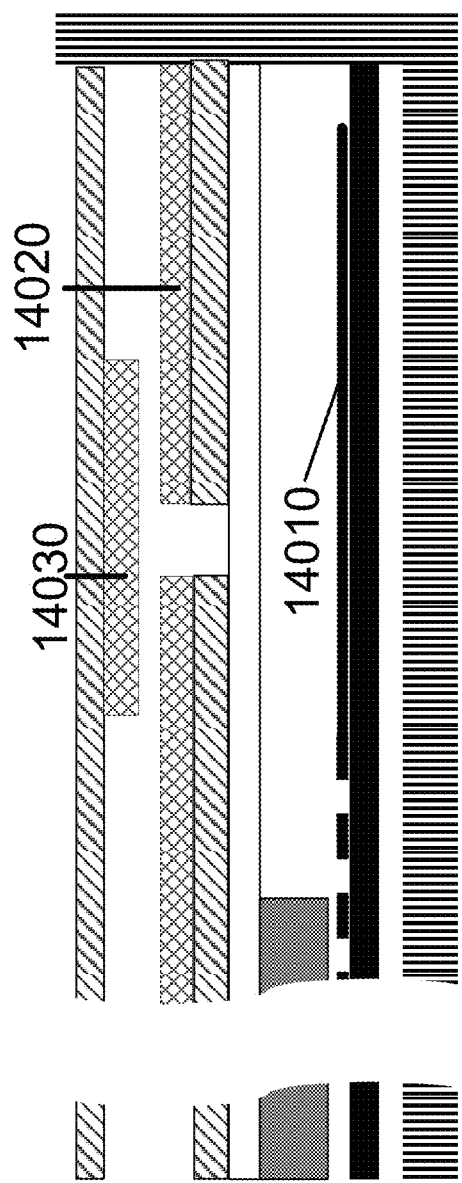
FIG. 14 shows one example mechanism to connect the RF source to the integrated antenna.

In some examples, the RF feed can include one or more of a conductive or non-conductive coupling. In an example, the non-conductive coupling can include a capacitive or near-field coupling structure, such as configured to transfer energy between a transmitter or receiver circuit and the antenna, without requiring an uninterrupted conductive electrical connection between the circuit and the antenna. For example, FIG. 14 shows a proximity coupling feed. The feed can include a first conductor, such as 14010 located on the motherboard of the mobile device, and a second conductor formed by the metalized border areas 14020 on one of the conductive transparent layers of the touchscreen. The first conductor can transmit or receive an RF signal (e.g., within a specified range of frequencies), coupled from or to the antenna 14030 also formed by the conductive boarders of another layer via such a proximity-based non-conductive antenna coupling between the first and second conductor. This proximity coupling scheme can lead to broadened frequency band coverage of the integrated antenna.

Other feed schemes and combinations can be used, for example, etchings of the silver ink of the metalized border area can form a transmission line and a ground line around the antenna and then run those lines to various convenient locations on the transparent conductive layer. These lines can then be fed by a FPC connector, or any other standard connection systems.

It should be noted that while an LCD was described for the display screen, that any type of display can be utilized. Example display types include but are not limited to: CRT, LED, LCD with LED backlighting, OLED, plasma, laser based displays, quantum dot displays, E-ink displays from E Ink Corporation of Cambridge, Mass., or the like. In some embodiments, a display is not included.

The integrated touch sensor antenna can be used in a variety of devices including cell-phones which include so-called "smart" phones, personal digital assistants, tablet computers, laptop computers, Point of Sale ("POS") devices, computer monitors or LCD displays, personal computers, televisions, touch screens on remote control devices, refrigerators, ovens, microwave ovens, washing machines, clothes dryers, automobiles, global positioning systems, and any other device in which a Radio Frequency transmission can be received and sent which also has a touchscreen.

Figure 15:
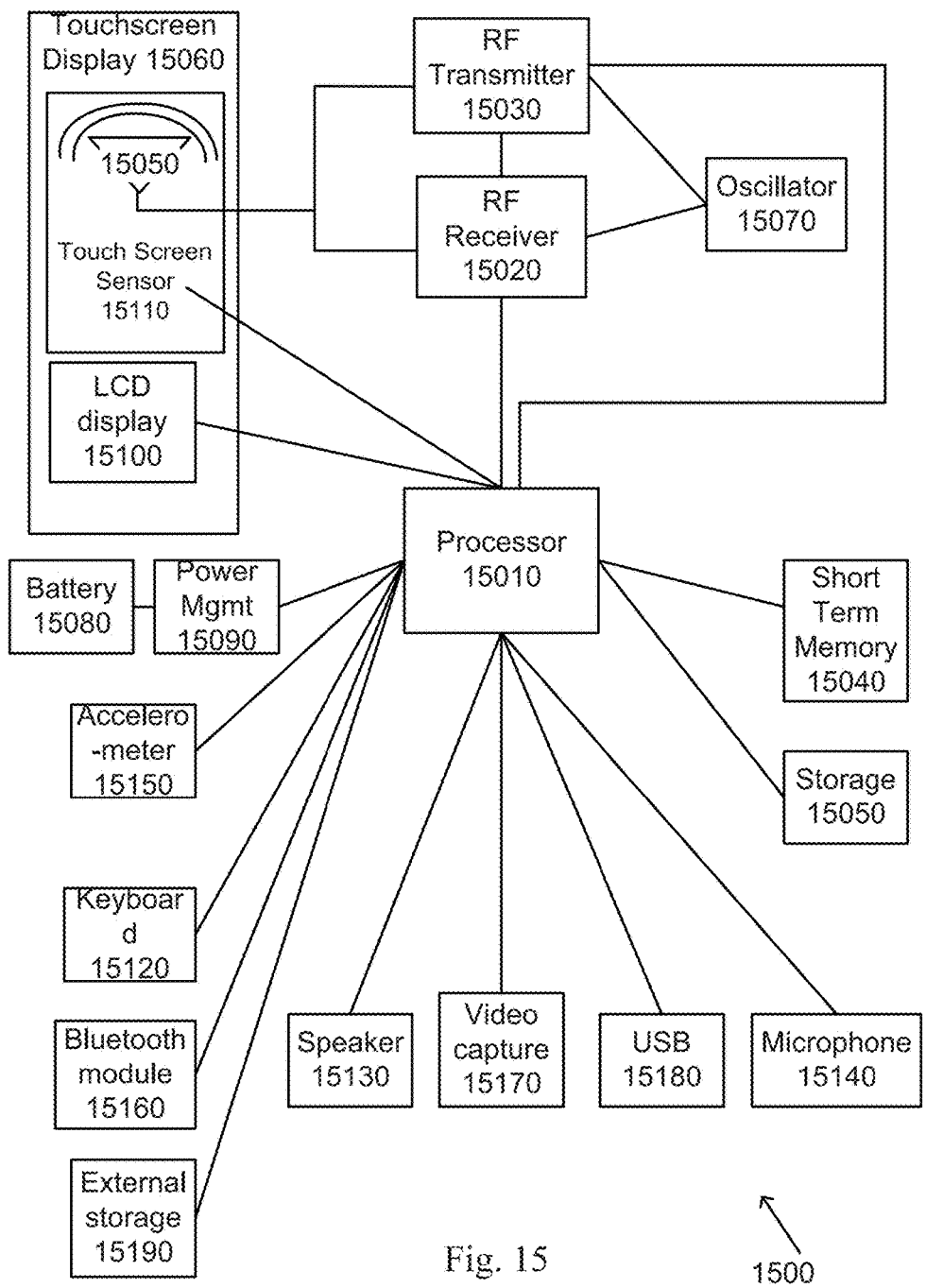
FIG. 15 shows one example device which can utilize the integrated touch screen and antenna.

FIG. 15 shows one example of such a device 15000 in the form of a mobile phone or "smart phone." Processor 15010 controls the baseband functions of the mobile as well as running applications and controlling peripherals. Processor 15010 can be any type of processor including RISC, CISC, VLIW, MISC, OISC, and the like. Processor 15010 can include a Digital Signal Processor ("DSP"). Processor 15010 can communicate with RF receiver 15020 and RF transmitter 15030 to transmit and receive wireless signals. Processor 15010 can utilize short term memory 15040 to store operating instructions and help in the execution of the operating instructions such as the temporary storage of calculations and the like. Processor 15010 can also utilize non-transitory storage 15050 to read instructions, files, and other data that requires long term, non-volatile storage.

RF Receiver 15020 and RF Transmitter 15030 can send signals to the integrated antenna 15050 of touchscreen display 15060. RF transmitter 15030 contains all the necessary functionality for transmitting radio frequency signals via. antenna 15050 given a baseband signal sent from Processor 15010. RF transmitter can contain an amplifier to amplify signals before supplying the signal to integrated antenna 15050. RF transmitter 15030 and RF Receiver 15020 are capable of transmitting and receiving radio frequency signals of any frequency including, microwave frequency bands (0.3 to 300 GHz) which include cellular telecommunications, WLAN and WWAN frequencies. Oscillator 15070 can provide a frequency pulse to both RF Receiver 15030 and RF Transmitter 15020.

Device 15000 can include a battery or other power source 15080 with associated power management process or module 15090. Power management module 15090 distributes power from the battery 15080 to the other various components. Power management module 15090 can also convert the power from battery 15080 to match the needs of the various components.

Processor 15010 can communicate and control other peripherals, such as LCD display 15100 with associated touch screen sensor 15110. Processor 15010 causes images to be displayed on LCD display 15100 and receives input from the touch screen sensor 15110 when a user presses on the touch-screen display.

Processor 15010 can receive input from a physical keyboard 15120. Processor 15010 can produce output such as ring tones, and other alerts which are played on the speaker 15130. Speaker 15130 can also be used to play voices (in the case of a voice call) that have been received from RF receiver 15020 and been decoded by Processor 15010. Microphone 15140 is used to transmit a voice for a voice call conversation to Processor 15010 for subsequent encoding and transmission using RF Transmitter 15030. Accelerometer 15150 provides input on the motion of the device 15000 to processor 15010. Accelerometer 15150 may be used in motion sensitive applications. Bluetooth module 15160 may be used to communicate with Bluetooth enabled external devices. Video capture device 15170 can be a still or moving picture image capture device or both. Video Capture device 15170 is controlled by Processor 15010 and can take and store photos, videos, and can be used in conjunction with microphone 15140 to capture audio along with video. USB port 15180 enables external connections to other devices supporting the USB standard and charging capabilities. USB port 15180 can include all the functionality to connect to, and establish a connection with an external device over USB. External storage module 15190 can include any form of removable physical storage media such as a flash drive, micro SD card, SD card, Memory Stick and the like.

External storage module 15190 can include all the functionality needed to interface with these media.

It will be appreciated by one skilled in the art that while these components are described separately, the functionality of one or more of the components can be grouped together in one component, or the functionality of one of the described components can be split into separate components. Additionally, some components might not be present at all.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

We claim:

1. An electronic device, comprising:
a touch sensor comprising electrode structures configured to determine a capacitance generated from a touch;
an antenna resonating structure configured to radiate or receive a signal; and
a radio frequency transmitter and receiver circuitry, coupled to the antenna resonating structure and the touch sensor, configured to transmit the signal via an antenna that is formed by the antenna resonating structure and the electrode structures,
wherein the electrode structures of the touch sensor form the antenna resonating structure configured to radiate or receive the signal, and further form a capacitor configured to provide the capacitance to the touch sensor in response to the touch, and wherein a non-conductive coupling comprising a proximity coupling operably couples the antenna resonating structure and the touch sensor with the radio frequency transmitter and receiver circuitry.

2. The electronic device of claim 1, wherein the antenna resonating structure and the touch sensor comprise a first conductive layer and a second conductive layer on opposite sides of an insulating material.

3. The electronic device of claim 1, wherein the antenna comprises an inverted F antenna.

4. The electronic device of claim 1, further comprising:
a first metalized border area and a second metalized border area of the electrode structures that face one another and form the electrode structures configured to detect a proximity data based on the capacitance from the touch.

5. The electronic device of claim 1, wherein the antenna resonating structure and the touch sensor comprise the first conductive layer and the second conductive layer that are connected to form one radiating structure.

6. The electronic device of claim 1, wherein the antenna resonating structure and the touch sensor comprise the first conductive layer and the second conductive layer comprising substantially similar patterns opposite one another.

7. The electronic device of claim 1, further comprising a casing having a touch screen display with a display screen coupled to the touch sensor, and an antenna feed, with a feed location and a ground location, coupled to the antenna resonating structure with the electrode structures.

8. A touch screen device, comprising:
a radio frequency transmitter and receiver circuitry;

a plurality of electrode structures on a first conductive layer and a second conductive layer, wherein the first conductive layer and the second conductive layer are opposite to one another and separated by an insulating material;

a sensor processor, operably coupled to the first conductive layer and the second conductive layer, configured to generate or process data related to a touch sensor based on a capacitance from the at least one of the first conductive layer or the second conductive layer; and wherein the at least one of the first conductive layer or the second conductive layer forms an antenna resonating structure configured to receive or transmit data and forms a capacitor electrode configured to provide the capacitance, and wherein a non-conductive coupling comprising a proximity coupling that operably couples the antenna resonating structure and the touch sensor with the radio frequency transmitter and receiver circuitry.

9. The touch screen device of claim 8, wherein the first conductive layer and the second conductive layer comprise similar patterns forming the antenna resonating structure.

10. The touch screen device of claim 8, wherein the antenna resonating structure comprises a feeding location and a ground location.

11. The touch screen device of claim 8, wherein the first conductive layer and the second conductive layer comprise a metalized border area at least partially bordering a transparent conductive layer, the metalized border area forming the plurality of electrodes for detecting a position of a touch on a touch screen display.

12. The touch screen device of claim 8, further comprising an antenna, formed from the first conductive layer and the second conductive layer respectively.

13. The touch screen device of claim 12, wherein the antenna is operatively coupled to the radio frequency transmitter and receiver circuitry to transmit the data via the at least one of the first conductive layer or the second conductive layer.

14. The touch screen device of claim 12, wherein the antenna is an inverted F shaped antenna.

15. The touch screen device of claim 11, further comprising a removed portion of the metalized border area that is adjacent the plurality of electrodes.

16. An electronic device, comprising:
a radio frequency transmitter and receiver circuitry configured to transmit data;
a touch sensor configured to measure a capacitance; and
a plurality of conductive structures coupled to the touch sensor and the radio frequency transmitter and receiver circuitry, wherein at least one of the plurality of conductive structures forms an antenna resonating structure configured to receive or transmit the data and forms a capacitor electrode to provide the capacitance to the touch sensor to measure the capacitance, and wherein the plurality of conductive structures is operably coupled to the touch sensor and the radio frequency transmitter and receiver circuitry based on a non-conductive coupling comprising a proximity coupling having a capacitive structure.

17. The electronic device of claim 16, wherein the RF feed comprises a first conductor located on a ground plane and a second conductor on the at least one of the plurality of conductive structures forming the antenna resonating structure.

18. The electronic device of claim 16, further comprising a pair of conductive layers comprising the plurality of conductive structures and a dielectric between the pair of conductive layers.

19. The electronic device of claim 18, wherein the antenna resonating structure comprises an inverted F shaped antenna formed from the plurality of conductive layers.

* * * * *